MONOSTABLE MULTIVIBRATOR PULSE SHAPER

Filed March 7, 1966

INVENTOR.
ROLAND T. ROGERS
BY
Samuelson & Jacob
ATTORNEYS

United States Patent Office 3,443,118

Patented May 6, 1969

3,443,118

MONOSTABLE MULTIVIBRATOR PULSE SHAPER

Roland T. Rogers, West Milford, N.J., assignor, by mesne assignments, to Amerace Esna Corporation, New York, N.Y., a corporation of Delaware Filed Mar. 7, 1966, Ser. No. 532,360

Int. Cl. H03k 3/284

U.S. Cl. 307—88 6 Claims

The invention relates to monostable multivibrator pulse shapers and in particular to those monostable multivibrator pulse shapers whose output pulses are usable, input count pulses for a magnetic core counter.

In order to provide a usable count pulse to a magnetic core counter such as has been described in my copending application Ser. No. 391,104, now Patent No. 3,377,582, filed Aug. 21, 1964, assigned to the assignee hereof, it is advisable to properly shape the pulse generated by the oscillator. Monostable multivibrator pulse shapers of the invention are employed to shape pulses delivered by oscillators, such as have been described in my copending application for Low Frequency Oscillator, filed of even date herewith, to counters such as have been described in my previously filed application Ser. No. 391,104, now Patent No. 3,377,582.

It is an important object of the invention to provide a monostable multivibrator pulse shaper which employs a toroidal, magnetic memory device whose windings are wound one over the other and over substantially all the circumference of the magnetic core.

It is a further object of the invention to provide such a monostable multivibrator pulse shaper which allows the magnetic core to exactly determine the amount of current it requires to return itself to proper magnetization level.

It is a still further object of the invention to provide such a monostable multivibrator pulse shaper which generates a wave shape which is normally difficult to generate.

It is a still further object of the invention to provide such a monostable multivibrator pulse shaper wherein the pulse width is determined by the characteristics of the magnetic memory device.

It is a still further object of the invention to provide such a monostable multivibrator pulse shaper whose output pulse is a usable count pulse for a magnetic core counter.

These and other objects, features, advantages and uses will be apparent during the course of the following description when taken in conjunction with the accompanying drawings wherein.

Figure 1:
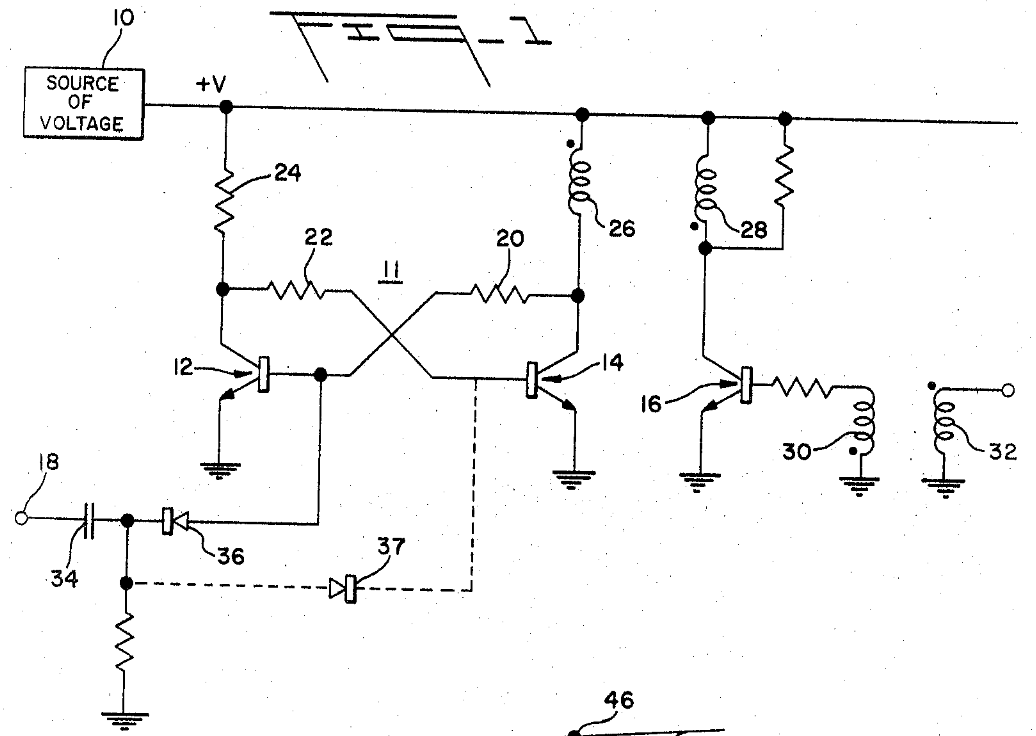
FIGURE 1 is a schematic diagram of a preferred embodiment of the monostable multivibrator pulse shaper of the invention.

In the drawings, wherein, for the purpose of illustration, is shown a preferred embodiment of monostable multivibrator pulse shaper of the invention, the numeral 10 designates a source of well-regulated positive voltage which supplies voltage to transistors 12, 14 and 16, all of which are preferably of the N-P-N conductivity type.

Circuit 11, which is comprised of transistors 12 and 14 and the associated parts, is a monostable multivibrator which has one stable state (transistor 12 conductive) and one quasi-stable state (transistor 14 conductive). It is forced into a condition in which it changes to the quasi-stable state. When this occurs, a cycle is initiated and an output pulse is delivered across winding 32.

At quiescence (with no input pulse applied to input terminal 18), transistor 12 is conductive due to the fact that winding 26 is of lower resistance than resistor 24 and the current through resistor 20 applies voltage to the base of transistor 12. Since there is no voltage drop across the collector-emitter junction of transistor 12, it is saturated and transistor 14 is held in a nonconductive state. Transistor 16 is nonconductive during quiescence because there is no voltage applied to its base under that condition.

Now, a negative-going pulse 50 (FIGURE 3) is applied to input terminal 18 and is coupled through capacitor 34 and diode rectifier 36 to the base of transistor 12. This makes transistor 12 nonconductive by back biasing its base-emitter junction. Therefore, the potential rises on the collector of transistor 12, causing current to flow through resistor 22 to the base of transistor 14. This causes transistor 14 to conduct. When transistor 14 conducts, full voltage is applied across winding 26 and transistor 12 is held in a nonconductive state.

Figure 3:
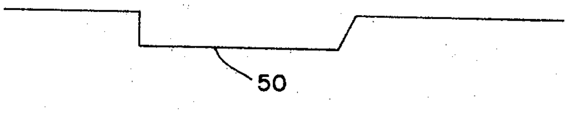
FIGURE 3 is a plot of the wave form of the trigger pulse applied to the monostable multivibrator pulse shaper of FIGURE 1.

Alternatively, a positive-going pulse of the same general shape as that illustrated in FIGURE 3 may be applied to input terminal 18 and be coupled through capacitor 34 and rectifier 37 to the base of transistor 14. This makes the base of transistor 14 positive and causes transistor 14 to conduct. When transistor 14 conducts, full voltage is applied across winding 26 to render transistor 12 nonconductive and hold it in that state for the period of time during which transistor 14 conducts.

Windings 26, 28, 30 and 32 are wound on a toroidal core of high permeability magnetic material to form a magnetic device of the type which has been described in my copending application Ser. No. 391,104, now Patent No. 3,377,582.

Figure 2:
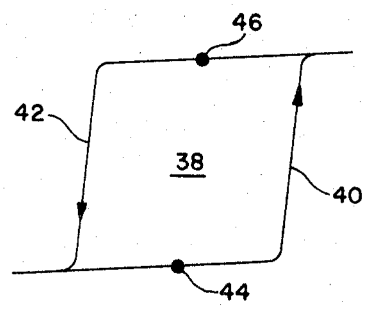
FIGURE 2 is a plot of the B–H curve for the core of a magnetic memory device used in the circuit of FIGURE 1.
Figure 4:
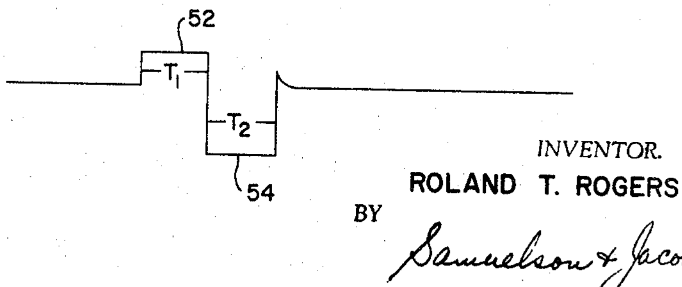
FIGURE 4 is a plot of the wave form at the output of the monostable multivibrator pulse shaper of FIGURE 1.

As transistor 14 conducts, the magnetization of the core follows along portion 40 of curve 38 (FIGURE 2) from point 44 to point 46. This takes place during time $T_1$, when a positive pulse (FIGURE 4) appears across winding 32.

The change in current through winding 26, when the core reaches positive saturation, causes the voltage across winding 26 to collapse. This applies base current to transistor 12, making it conductive and making transistor 14 nonconductive. When transistor 14 becomes nonconductive, a reverse voltage transient is induced in winding 26, which is coupled to the other windings on the core. The polarity of winding 30 is such that the transient makes transistor 16 conductive. When transistor 16 conducts, the full supply voltage appears on winding 28 and since winding 28 is opposite to winding 26, the magnetization of the core follows portion 42 of curve 38 from point 46 to point 44. During this time $T_2$, pulse 54 (FIGURE 4) is induced across output winding 32. Pulses from the output of the monostable multivibrator pulse shaper are applied to the input of the magnetic counter.

The magnetic counter of my copending application, Ser. No. 391,104, now Patent No. 3,377,582, will accept as a pulse count a pulse 54 which has been properly shaped by the monostable multivibrator pulse shaper of the invention.

While a particular embodiment of the invention has been shown and described, it is apparent to those skilled in the art that modifications are possible without departing from the spirit of the invention or the scope of the subjoined claims.

The embodiments of the invention in which an exclusive property or privilege is claimed are defined as follows:

1. A monostable multivibrator pulse shaper for delivering a usable count pulse from an oscillator to the input of a magnetic core counter comprising:

a source of positive voltage;

a magnetic memory comprising a toroidal core of square loop, magnetic material and a plurality of windings wound on the core;

a monostable multivibrator having a stable state and a quasi-stable state and comprising a first transistor and a second transistor;

a third transistor;

means connecting the source of positive voltage to the transistors of the monostable multivibrator and to the third transistor such that in the stable state of the monostable multivibrator, the first transistor conducts and the second transistor and the third transistor do not conduct and such that in the quasi-stable state of the monostable multivibrator the second transistor conducts and the first transistor does not conduct;

input means for applying an input pulse to the base of one of the transistors of the monostable multivibrator to cause the monostable multivibrator to change from its stable state to its quasi-stable state;

a first winding of the magnetic memory being connected to the second transistor such that when the second transistor conducts, full voltage appears across said winding to maintain the first transistor nonconducting;

a second winding and a third winding of the magnetic memory being connected to the third transistor such that when the input pulse ceases, the change in current flow through the first winding induces current flow in the second winding and the third winding in such directions as to bring the third transistor into conduction; and a fourth winding of the magnetic memory being placed such that an output pulse appears across it when the third transistor is conducting.

2. A monostable multivibrator pulse shaper as described in claim 1 wherein the first, second and third transistors are of the N-P-N type and each transistor has a base, a collector and an emitter and including a first resistor connected between the source of voltage and the collector of the first transistor and a second resistor connected from the junction of the first resistor and the collector of the first transistor and the base of the second transistor.

3. A monostable multivibrator pulse shaper as described in claim 2 wherein the first winding is connected between the source of voltage and the collector of the second transistor and including a third resistor connected from the base of the first transistor to the junction of the first winding and the collector of the second transistor.

4. A monostable multivibrator pulse shaper as described in claim 3 wherein the second winding is connected between the source of voltage and the collector of the third transistor and the third winding is connected in the base circuit of the third transistor.

5. A monostable multivibrator pulse shaper as described in claim 1 wherein the input means comprises means to apply a negative-going pulse to the base of the first transistor.

6. A monostable multivibrator pulse shaper as described in claim 1 wherein the input means comprises means to apply a positive-going pulse to the base of the second transistor.

References Cited

UNITED STATES PATENTS 3,157,864 11/1964 Hoedemaker et al. ---- 307—273

BERNARD KONICK, *Primary Examiner.*

PHILIP SPERBER, *Assistant Examiner.*

U.S. Cl. X.R.

307—273